United States Patent
Sinstedten

(10) Patent No.: US 7,699,238 B2
(45) Date of Patent: Apr. 20, 2010

(54) CONDENSATE DRAINAGE WITH MAINTENANCE INTERFACE

(75) Inventor: Johannes Sinstedten, Korschenbroich (DE)

(73) Assignee: Beko Technologies GmbH, Neuss (DE)

( * ) Notice: Subject to any disclaimer, the term of this patent is extended or adjusted under 35 U.S.C. 154(b) by 541 days.

(21) Appl. No.: 11/471,388

(22) Filed: Jun. 20, 2006

(65) Prior Publication Data
US 2007/0001019 A1    Jan. 4, 2007

(30) Foreign Application Priority Data
Jun. 20, 2005    (DE) .................. 10 2005 028 632

(51) Int. Cl.
*G05D 15/00* (2006.01)
*F16T 1/20* (2006.01)
(52) U.S. Cl. ............... 236/52; 137/192; 62/150
(58) Field of Classification Search ........... 137/183, 137/192, 196; 62/150; 236/52, 54, 55, 65, 236/93 R
See application file for complete search history.

(56) References Cited

U.S. PATENT DOCUMENTS

| 4,306,590 | A  | * | 12/1981 | Boudreau ............. 137/885 |
| 2003/0116191 | A1 | * | 6/2003 | Dobies et al. ........ 137/204 |
| 2003/0178411 | A1 | * | 9/2003 | Manganiello et al. ...... 219/496 |
| 2006/0010727 | A1 | * | 1/2006 | Fung ................. 38/77.3 |
| 2006/0048818 | A1 | * | 3/2006 | Welch et al. ........ 137/269 |
| 2006/0055415 | A1 | * | 3/2006 | Takita ............... 324/658 |

FOREIGN PATENT DOCUMENTS

EP    0 391 250 B1    4/2003

* cited by examiner

*Primary Examiner*—Marc E Norman
(74) *Attorney, Agent, or Firm*—McCarter & English, LLP

(57) ABSTRACT

The present invention relates to a steam trap for draining off condensate from a collecting chamber in which condensate resulting in a pressure gas system is collected, the collecting chamber being pressurized by a gas pressure which, depending upon the operating state of the pressure gas system, may be a negative pressure below the atmospheric pressure, an overpressure above the atmospheric pressure or an atmospheric pressure itself. The steam trap may be separated via an interface into an integral first assembly unit and an integral maintenance assembly unit which comprises the essential wear and tear parts.

9 Claims, 3 Drawing Sheets

CONDENSATE DRAINAGE WITH MAINTENANCE INTERFACE

CROSS-REFERENCE TO RELATED APPLICATIONS

This application claims priority to German Application No. DE102005028632.1, filed Jun. 20, 2005, the contents of which are expressly incorporated by reference in their entirety as part of the present disclosure.

BACKGROUND

The present invention relates to a steam trap for draining off condensate from a collecting chamber in which condensate resulting in a pressure gas system is collected, the collecting chamber being pressurized by a gas pressure which, depending upon the operating state of the pressure gas system, may be a negative pressure below the atmospheric pressure, an overpressure above the atmospheric pressure or an atmospheric pressure itself, with the steam trap comprising the following components:

a level indicator being designed for indicating the level of filling of condensate within the collecting chamber, in particular when a maximal level of filling is reached or exceeded within the collecting chamber, an outlet valve which is associated with the collecting chamber and designed for draining off condensate from the collecting chamber, in particular against the atmospheric pressure, an electronic unit which evaluates the signal emitted by the level indicator and activates the outlet valve when the maximal filling level in the collecting chamber is reached or exceeded, a housing with a compressed-air connection (24) for the connection with the pressure gas system and an outlet.

Condensate is usually generated in compressed-air systems which, apart from water, may also contain oil. The oil essentially arises in compressors where it is used as a lubricant. For this reason, the condensate in the compressed-air systems has an adverse effect, it is, as a general rule, very aggressive and must therefore be collected and drained off from time to time from the pressure gas system which is a closed pressure gas system per se. In doing so, the loss of gas or of compressed air is to be kept as low as possible. This task is solved by generic steam traps.

Consequently, steam traps consist essentially of a unit for the indication of at least one level (the "level indicator") in a condensate collecting chamber and of a valve. Depending upon the indicated level, the valve is activated by means of a mechanical or an electro-mechanical device. By means of the gas pressure existing in the collecting chamber, the condensate is discharged from the compressed-air system via the valve.

A regular maintenance of these devices is required because wear and tear and contamination impair their function after a prolonged operating time. As a general rule, maintenance is, however, restricted to the mechanical part of the steam trap whereas the part which contains the electric control requires no maintenance.

Such a steam trap is known for instance from EP 0 391 250 B1. The same describes a device for the draining-off of condensate from compressed-air systems or the like, with a collecting chamber for condensate permanently coupled to the compressed-air system and with a diaphragm valve sealing the outlet of the collecting chamber, with two sensors for recording and indicating two capacitive, different filling levels and controlling the diaphragm valve via an electronic unit and a control valve being arranged within the collecting chamber. The sensors are arranged in a vertical distance from each other in a tube which vertically projects into the collecting chamber and which is closed at its outer end, and they are electrically connected with the control valve. All the components mentioned are accommodated within one housing, and they are connected with each other by means of conventional fastening and connecting devices. A disadvantage of the steam trap described above is that the same must, as a general rule, be disconnected from the electric power supply for maintenance work. This always requires a trained electrician or an expert in the field of electrical engineering unless the device is connected to the power supply and/or to a control unit by means of costly electric plugs which can also be handled by non-experts. Such plug-and-socket connectors are expensive, and their wiring is a difficult operation. As far as the maintenance of the mechanical parts is concerned, no electrician or expert in the field of electrical engineering is required. After the removal from the compressed-air system, the devices must then be disassembled in order to maintain and/or repair moving parts and gaskets. Furthermore, the collecting chamber and the sensors are to be cleaned. Prior to the re-start of operation, a function and pressure test is required. This makes maintenance work time-consuming, and the possibility of a faulty assembly exists.

Maintenance is required on a regular basis and entails a rather high expenditure. The expenses essentially depend upon the fact that the replacement of individual components is time-consuming and expensive. Another disadvantage is that during maintenance work the steam trap has to be disconnected from the pressurized system for a comparatively long period of time.

SUMMARY

The object of the present invention is to provide a steam trap which facilitates a quick and easy maintenance. Nevertheless, the steam trap must meet the requirements placed on it in respect of tightness and reliability.

According to the invention, the object is accomplished by the fact that the steam trap is designed as an integrated first assembly unit and an integrated maintenance assembly unit containing the essential wear and tear parts and which can be separated from each other by means of an interface.

An important finding regarding the invention is that the maintenance work is comparatively costly and time-consuming due to the fact that almost all of the many wear and tear parts of the components can only be removed and replaced through the opening of the housing. In order to avoid this disadvantage, the invention suggests that the steam trap be designed in such a way that it can be separated into two assembly units, an assembly unit with components of little wear and tear or free from wear and tear and into an assembly unit with wear-intensive components.

Components with only little wear and tear are for instance the electronic unit and the housing for the electronic unit itself; on the other hand, the valves are exposed to a considerably greater wear and tear. The outlet valve may, for instance, be provided as a diaphragm valve which, due to its motion, must be regularly replaced. The control valve and the air-exhaust valve, too, are exposed to a comparatively great wear and tear, due to their heavy use.

A major advantage of the invention is that in the event of a required maintenance work the existing and used maintenance assembly unit can be completely replaced as such by a new maintenance assembly unit. Instead of a new unit, also a used and repaired and tested maintenance assembly unit may be used.

According to the invention, the maintenance assembly unit is connected with the first assembly unit by just one or by a few mechanical connecting means so that a separation of the maintenance assembly unit from the first assembly unit can be performed quickly and easily.

What matters is that the two assembly units in their assembled state must be pressure-proof to the outside. This means that when only one assembly unit contains all the pressurized components only this unit must be pressure-proof to the outside, i.e. also in respect of the other assembly unit. If both assembly units are under pressure, also the interface itself must be made pressure-proof to the outside. This objective can be reached with known gaskets. Rubber gaskets and/or O-ring seals have proved to be particularly advantageous and cost-effective.

In a first embodiment, the first assembly unit consists of the electronic unit which is preferably connected with a level indicator while the maintenance assembly unit contains the housing and all other components. A mechanical interface and an electric interface are provided between the electronic unit and the housing with the other components, i.e. the pressurized components. In the event of a required maintenance, the first assembly unit is detached from the maintenance assembly unit, and the maintenance assembly unit on its part is itself separated from the pressure connections (condensate inlet and outlet). The maintenance assembly unit can then be replaced immediately and the new, overhauled steam trap can be connected to the compressed-air pipe.

The otherwise usual pressure test of the maintenance assembly unit on site is no longer required because the same can already be performed in the factory. The cleaning and the replacement of gaskets in the maintenance assembly unit on site, too, is not necessary. A detachable mechanical connection is advantageously provided between the maintenance assembly unit and the control unit as well as an electric contact for valve activation. The level indicator and/or the sensor may optionally be associated with one of the two assembly units.

In a second embodiment, the first assembly unit contains, apart from the electronic unit, also the housing which comprises the compressed-air connections. During maintenance work, a separation of the external pressure connections (condensate inlet and outlet) is therefore not necessary, and the housing remains connected to the same. Correspondingly, the electronic unit also remains in its place during maintenance work. Also in this case, the maintenance assembly unit comprises all the essential wear and tear parts, only that they are practically fastened to the bottom of the housing and/or connected with the same. In the event of maintenance work, only one connecting means is detached in a particularly advantageous embodiment and the bottom with all its wear and tear parts is pulled out of the housing.

Correspondingly arranged and designed gasket elements provide for the pressure sealing of the assembled steam traps. What is essential in the sealing-off of the two assembly units against each other is the fact that the compressed air which flows in through the compressed-air connection is guided into the collecting chamber and is fed from there to the control pipe and/or the outlet valve. Consequently, the gaskets are arranged and designed in such a way that bypasses are avoided and that an increased pressure and/or compressed air does also only reach those areas which are specifically designed for that. Malfunctions of the steam trap are effectively avoided by means of relevant gaskets.

The invention will be described below by means of two embodiments. The same are to be understood as examples only and they shall not limit the invention to the details that are shown.

BRIEF DESCRIPTION OF THE DRAWINGS

The figures show.

DETAILED DESCRIPTION

Figure 1:
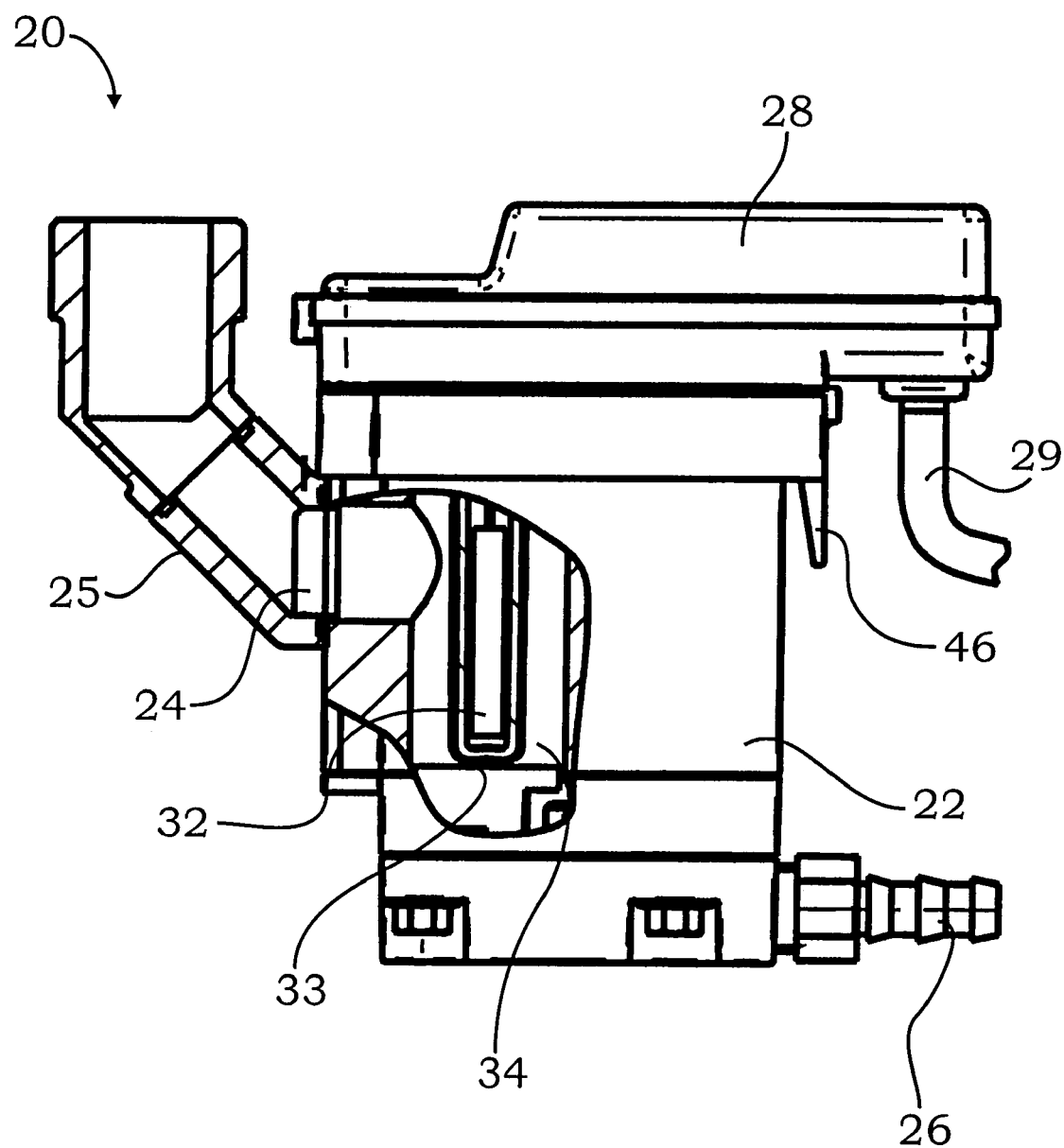
FIG. 1: a side elevation view, partly sectional, of a steam trap according to the invention.

The figures show a steam trap 20 according to the invention. It comprises a housing 22 which includes a compressed-air connection 24 for a connection to a pressure gas pipe, in particular to a compressed-air pipe 25 and an outlet 26 for the draining-off of the condensate to the outside.

An electronic unit 28 is connected with housing 22. The electronic unit comprises an electric connection 29 for a power supply. Furthermore, the electronic unit is connected with a level indicator 32 which comprises in the embodiment capacitive sensors. Each of these sensors is connected with the electronic unit via electric lines. Hence, the condensate level in the receptacle can be recorded capacitively by electronic means without any wear and tear of any parts.

The level indicator 32 projects from above into a collecting chamber 34 in which condensate which gets into it via the compressed-air connection that is also connected with the collecting chamber 34 is precipitated and collected. The level indicator 32 is located within a casing 33 which is pressure-tight in respect of the collecting chamber.

The collecting chamber 34 is sealed by means of an outlet valve which is provided for draining off—when in an opened position—condensate from the collecting chamber, in particular against the atmospheric pressure through outlet 26. This means that the collecting chamber 34 is pressurized by means of the compressed-air connection 24; the electronic unit 28 is, on the other hand, not pressurized.

The invention does now provide for the possibility to quickly and easily separate the steam trap 20 for maintenance work into a first assembly unit 45 and into a maintenance assembly unit 47. The separation is made by means of one interface or several interfaces which also include the electric connections (when provided).

Figure 2:
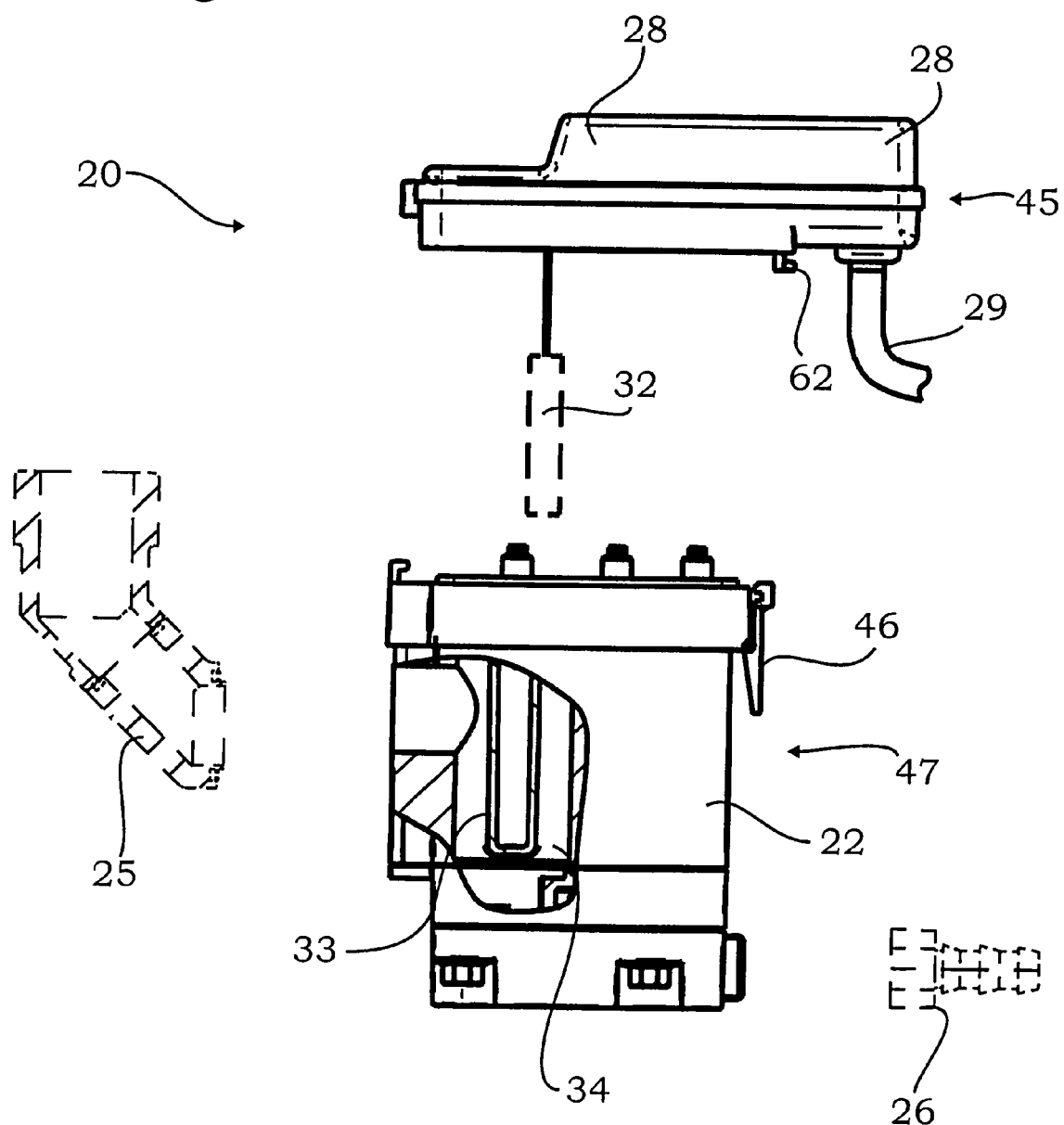
FIG. 2: the steam trap according to the invention of FIG. 1 in a separated state according to a first embodiment.

According to the first embodiment which is shown in FIGS. 1 and 2, the first assembly unit 45 contains the electronic unit 28 which is connected with the level indicator 32 and the electric connection. In the event of maintenance work, the housing 22 is, therefore, separated from the electronic unit 28 and the compressed-air pipe 25 and outlet 26. The level indicator 32 may optionally be associated with one of the two assembly units 45, 47.

The maintenance assembly unit 47 includes all elements or components which are exposed to an increased wear and tear. This includes in particular valves, spring elements, gaskets, etc. The maintenance assembly unit 47 is replaced in its entirety so that no cleaning work for the maintenance assembly unit 47 is required on site. The elements of the maintenance assembly unit 47, too, need not undergo a pressure test. Electric connections are provided between the two assembly units which are separated by detaching the first assembly unit 45 from the maintenance assembly unit 47 and/or get into contact with each other by means of the assembly of the two assembly units. Advantageously, the two assembly units 45, 47 are inter-connected by means of a connection which is quickly and easily releasable. This purpose is served in particular by lock devices or positive connecting means which can be released by means of levers. A lever 46 is, for instance, shown which catches as a locking element behind a lug and/or a lip 62.

In a particularly advantageous embodiment, also the compressed-air connection 24, i.e. the condensate inlet is provided with a quick-acting catch for providing a quick and easy connection with the compressed-air pipe. The same applies to outlet 26 which may also be connected with a pipe which, for instance, leads into a separate receptacle.

Figure 3:
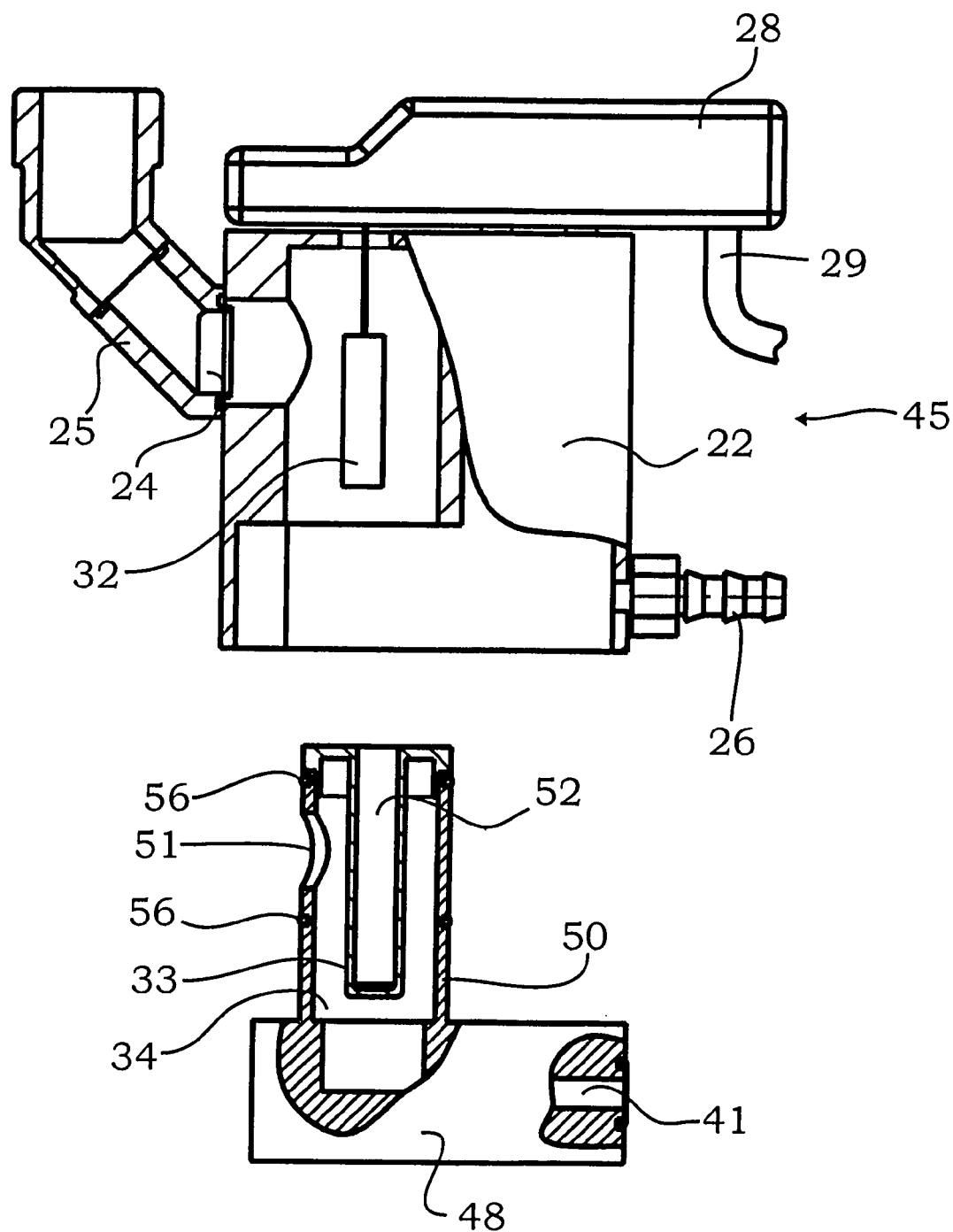
FIG. 3: the steam trap according to the invention of FIG. 1 in a separated state according to a second embodiment.

According to the embodiment of FIG. 3, the first assembly unit 45 consists of the electronic unit 28 and the housing 22. The level indicator 32 which is connected with the electronic unit 28 is also associated with the first assembly unit 45. The remaining components, i.e. all components which are exposed to an increased wear and tear are part of the maintenance assembly unit 47.

The maintenance assembly unit 47 of the embodiment of FIGS. 2 and 3 is positioned on a bottom plate 48 of housing 22. This means that a collecting chamber housing 50 is formed on the bottom plate 48 in which the collecting chamber 34 is formed. The collecting chamber 34 is provided with an opening 51 for the compressed-air connection 24 and with a level indicator chamber 52 for accommodating the level indicator 32. The collecting chamber housing 50 extends vertically from the bottom plate 48. Depending upon the configuration, the level indicator chamber 52 for the accommodation of the level indicator 32 is also provided in the embodiment according to FIG. 2.

Furthermore, FIG. 3 also shows an outlet pipe 41 for the condensate which is connected with the collecting chamber 34 and outlet 26.

Consequently, the maintenance assembly unit 47 can be inserted from below into the housing 22 into the first assembly unit 45 and can be advantageously attached by means of only one connecting element (not shown). A screw, a locking pin or the like which are commercially available are suited as a connecting element.

With a view to ensuring a faultless functioning of the steam trap 20, gaskets 56 are provided which ensure that only those areas are pressurized which in actual fact are to be exposed to pressure. Consequently, the collecting chamber housing 50 and/or the opening 51 are sealed off against the first assembly unit 45. For this purpose, O-sealing rings are provided in the shown embodiment which are arranged above and below the opening 51 so that compressed air which enters through the compressed-air connection 24 can exclusively get into the collecting chamber 34 and/or into only a small ring area between the collecting chamber housing 50 and the first assembly unit 45 and/or housing 22.

In the embodiment according to FIG. 3, gaskets 56 in the form of O-sealing rings are also provided which seal off the maintenance assembly unit against outlet 26.

Instead of the gaskets which are shown all gaskets which serve the same purpose may be used. The location, i.e. the arrangement of the gaskets, too, depends upon the respective embodiment of the steam trap 20 and can, therefore, be varied.

An essential advantage of the second embodiment of the steam trap 20 according to the invention is that the housing 22 need not be detached from the compressed-air pipe for the replacement of the maintenance assembly unit 47. In order to replace the maintenance assembly unit 47 it is only necessary to release the mechanical connecting element and to pull the maintenance assembly unit out of the first assembly unit 45 and/or the housing 22. As a routine operation, it may be useful to check and to clean the gaskets 56 during maintenance work and to perform, if appropriate, a final tightness test.

Consequently, the essential advantage of the invention is that the inventive steam trap 20 can be separated into two assembly units 45, 47, i.e. into the first assembly unit 45 which during maintenance at regular intervals contains those parts which do not require regular maintenance and are exposed only to little wear and tear, and the maintenance assembly unit 47 which contains those components which in the course of the regular maintenance must be regularly checked and/or replaced. Hence, the steam trap 20 of the invention can be separated into two parts by means of a few manipulations, i.e. both parts and/or the first assembly unit 45 and the maintenance assembly unit 47 may each be handled as an own integral unit. This results in a considerable reduction of time and costs that are required for maintenance work.

The invention is not limited to the embodiments that are described. For instance, a magnetic float switch attached to a rod which switches contacts located in the rod may also be used as a level indicator 32.

The device shown and described offers at least the following advantages: a time-consuming disassembly, cleaning and pressure testing of the steam trap 20 is not required; the possibility of making errors during maintenance work is minimized; replacement of all wear and tear parts in an assembly unit which is easy to handle; and maintenance without the use of tools is possible.

What is claimed is:

1. Steam trap for draining off condensate from a collecting chamber in which condensate that is generated in a pressure gas system is collected, with the collecting chamber being pressurized with a gas pressure which, depending upon the operating state of the pressure gas system, may be a negative pressure below the atmospheric pressure, an overpressure above the atmospheric pressure or an atmospheric pressure itself, the steam trap comprising:
   a. a level indicator being designed for indicating the level of filling of condensate in the collecting chamber, including when a maximal level of filling in the collecting chamber is reached or exceeded;
   b. an outlet valve which is associated with the collecting chamber and is designed for draining off condensate from the collecting chamber, including against the atmospheric pressure;
   c. an electronic unit which evaluates the signal emitted by the level indicator and activates the outlet valve when the maximal level of filling in the collecting chamber is reached or exceeded; and
   d. a housing with a compressed-air connection for the connection with the pressure gas system and an outlet;
   wherein the steam trap is implemented via an interface separable into an integral first assembly unit and an integral maintenance assembly unit which contains at least one of a valve, a spring and a gasket,
   wherein the integral first assembly unit and the integral maintenance assembly unit can be separated at the interface without removing any part of the housing, and wherein any mechanical and electrical connection between the integral first assembly unit and the integral maintenance assembly unit is severed by separation of the units at the interface.

2. The steam trap according to claim 1 wherein the first assembly unit is formed by the electronic unit with the level indicator and an electric connection that powers the steam trap.

3. The steam trap according to claim 1 wherein the first assembly unit is formed by the electronic unit with an electric connection that powers the steam trap.

4. The steam trap according to claim 1 wherein the first assembly unit is formed by the electronic unit with the level indicator, an electric connection that powers the steam trap, and the housing.

5. The steam trap according to claim 1 wherein the level indicator is provided with capacitive sensors.

6. The steam trap according to claim 1 wherein the level indicator is formed by a magnetic float switch attached to a rod, which switches contacts that are located in the rod.

7. The steam trap according to claim 1 wherein the outlet valve is a diaphragm valve.

8. The steam trap according to claim 1 wherein at least one gasket is provided to ensure that in an assembled operating state at least the first assembly unit is not exposed to pressure.

9. The steam trap according to claim 8 wherein the at least one gasket is an O-sealing ring.

* * * * *